(12) United States Patent
Muehlleitner

(10) Patent No.: US 11,717,908 B2
(45) Date of Patent: Aug. 8, 2023

(54) WELDING UNIT AND METHOD FOR WELDING RAILS OF A TRACK

(71) Applicant: PLASSER & THEURER EXPORT VON BAHNBAUMASCHINEN GESELLSCHAFT M.B.H., Vienna (AT)

(72) Inventor: Heinz Muehlleitner, Neidling (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 1097 days.

(21) Appl. No.: 16/082,016

(22) PCT Filed: Feb. 2, 2017

(86) PCT No.: PCT/EP2017/000136
§ 371 (c)(1),
(2) Date: Sep. 4, 2018

(87) PCT Pub. No.: WO2017/148563
PCT Pub. Date: Sep. 8, 2017

(65) Prior Publication Data
US 2020/0282487 A1    Sep. 10, 2020

(30) Foreign Application Priority Data
Mar. 2, 2016    (AT) .................................. A 107/2016

(51) Int. Cl.
*B23K 11/04* (2006.01)
*B23D 79/02* (2006.01)
(Continued)

(52) U.S. Cl.
CPC .......... *B23K 11/046* (2013.01); *B23D 79/026* (2013.01); *E01B 11/44* (2013.01); *E01B 31/12* (2013.01); *B23K 2101/26* (2018.08)

(58) Field of Classification Search
CPC ... B23K 2101/26; B23K 11/046; E01B 29/46; E01B 11/44; E01B 31/12; B23D 79/026
See application file for complete search history.

(56) References Cited

U.S. PATENT DOCUMENTS

| 3,978,746 A | 9/1976 | Kuchuk-Yatsenko et al. |
| 4,175,897 A | 11/1979 | Kuchuk-Yatsenko et al. |

(Continued)

FOREIGN PATENT DOCUMENTS

| CN | 1032049 A | 3/1989 |
| CN | 1435535 A | 8/2003 |

(Continued)

*Primary Examiner* — Dana Ross
*Assistant Examiner* — Kuangyue Chen
(74) *Attorney, Agent, or Firm* — Laurence A. Greenberg; Werner H. Stemer; Ralph E. Locher

(57) ABSTRACT

A welding unit for welding rails of a track has a unit lower edge forming a lower boundary of the welding unit, with regard to a vertical, and a shearing device provided for removing a weld bead. A rail base section of the shearing device is designed to be lowered, relative to the welding unit, by way of a drive from a rest position situated above the unit lower edge into a shearing position situated below the unit lower edge. Thus, the welding operation can be carried out without lifting the rails from the sleepers.

4 Claims, 2 Drawing Sheets

(51) Int. Cl.
 *E01B 11/44* (2006.01)
 *E01B 31/12* (2006.01)
 *B23K 101/26* (2006.01)

(56) References Cited

U.S. PATENT DOCUMENTS

| | | | |
|---|---|---|---|
| 4,955,301 | A | 9/1990 | Theurer et al. |
| 5,901,627 | A * | 5/1999 | Johnson ................. B23K 26/26 83/452 |
| 6,762,390 | B2 | 7/2004 | Theurer et al. |
| 6,886,470 | B2 * | 5/2005 | Norby .................... B23K 11/04 104/15 |
| 8,735,761 | B2 | 5/2014 | Theurer et al. |
| 2002/0153354 | A1 * | 10/2002 | Norby .................... B23K 11/04 219/55 |
| 2011/0168675 | A1 * | 7/2011 | Theurer ............. B23K 11/0073 219/53 |

FOREIGN PATENT DOCUMENTS

| | | |
|---|---|---|
| CN | 201614531 U | 10/2010 |
| EP | 0119820 A1 | 9/1984 |
| EP | 0132227 B1 | 12/1986 |
| EP | 2315877 B1 | 2/2012 |
| GB | 2185703 A | 7/1987 |
| WO | 2015010630 A1 | 1/2015 |

* cited by examiner

WELDING UNIT AND METHOD FOR WELDING RAILS OF A TRACK

BACKGROUND OF THE INVENTION

Field of the Invention

The invention relates to a welding unit for welding rails of a track, having a unit lower edge forming a lower boundary of the welding unit—with regard to a vertical—and a shearing device provided for removing a weld bead, the shearing device being composed of a head part designed to be placed on a rail head, two side parts movable towards one another in each case, and a rail base section provided for being applied to a rail base when in a shearing position.

The invention also relates to a method for welding rails of a track and subsequently shearing off a weld bead by means of a shearing device.

Welding units of this kind for so-called mobile flash-butt welding have already become known in various embodiments from a multitude of publications, such as from EP 2 315 877 or GB 2 185 703 A, for example.

A further welding unit is known from EP 0 132 227 B1, in which two unit components are connected to one another by means of a toggle lever. The displacement cylinders are fastened to a transverse beam on which clamping drives for gripping the rail are provided.

In U.S. Pat. No. 3,978,746, a shearing device for removing a weld bead is described in more detail. For shearing, the two side parts are applied to the rail by being pivoted towards one another.

SUMMARY OF THE INVENTION

It is the object of the present invention to provide a welding unit or method of the type mentioned at the beginning with which an improved welding operation is possible.

According to the invention, this object is achieved with a welding unit or method of the specified kind by way of the features as claimed.

Due to the vertical adjustability of the rail base section or of the entire shearing device, it is possible to employ a specially designed welding unit having a unit lower edge which is merely slightly distanced with respect to the rail clamping jaws of the unit. This provides the particular advantage that the two rail ends need to be raised from the sleepers only slightly or not at all for the welding operation, thus avoiding adverse tensions.

Since the shearing device is raised above the unit lower edge, with regard to the lower section, there are no problems even if the shearing device by chance comes to lie above a sleeper during the welding operation. For the finalizing shearing operation, merely a slight lifting of the welding unit together with the welded rail is required in order to subsequently be able to lower and pivot the rail base section inward into the shearing position without problems. As a result of the welding process having already been carried out, the rail tensions resulting from the necessary lifting for shearing off the bead are no longer problematic.

Additional advantages of the invention become apparent from the dependent claims and the drawing description.

BRIEF DESCRIPTION OF THE SEVERAL VIEWS OF THE DRAWING

The invention will be described in more detail below with reference to embodiments represented in the drawing.

DESCRIPTION OF THE INVENTION

Figure 1:
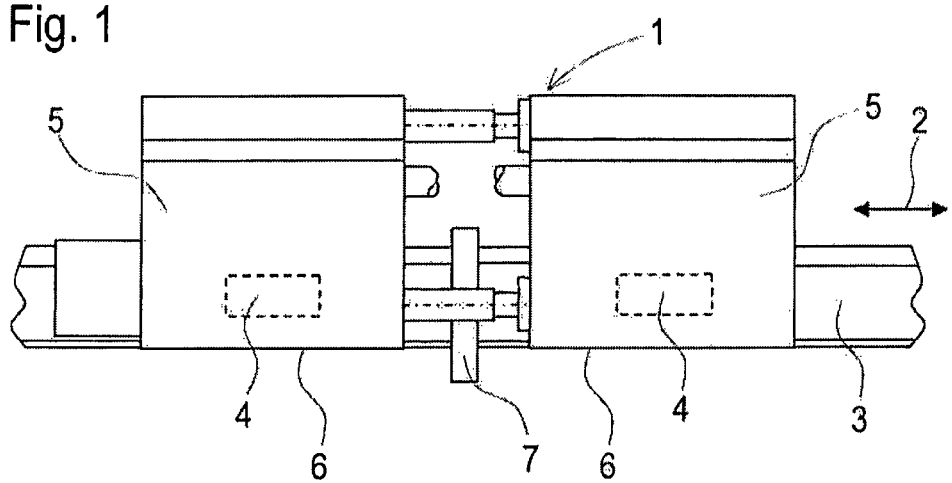
FIG. 1 shows a side view of a welding unit having a shearing device for a weld bead, FIGS. 2, 3 each show an enlarged view of the shearing device in a longitudinal direction of the rail.

A welding unit 1, already known in manifold embodiments, consists essentially of two unit parts 5 which are movable towards one another with regard to a longitudinal direction 2 of the rail and each have clamping jaws 4 designed to be applied to a rail 3. Said unit parts 5 have as a lower boundary—with respect to a vertical—a unit lower edge 6 which, in a special design variant shown here, is spaced only slightly from the clamping jaws 4. Arranged between the two unit parts 5 is a shearing device 7 provided for shearing off a weld bead.

Figure 2:
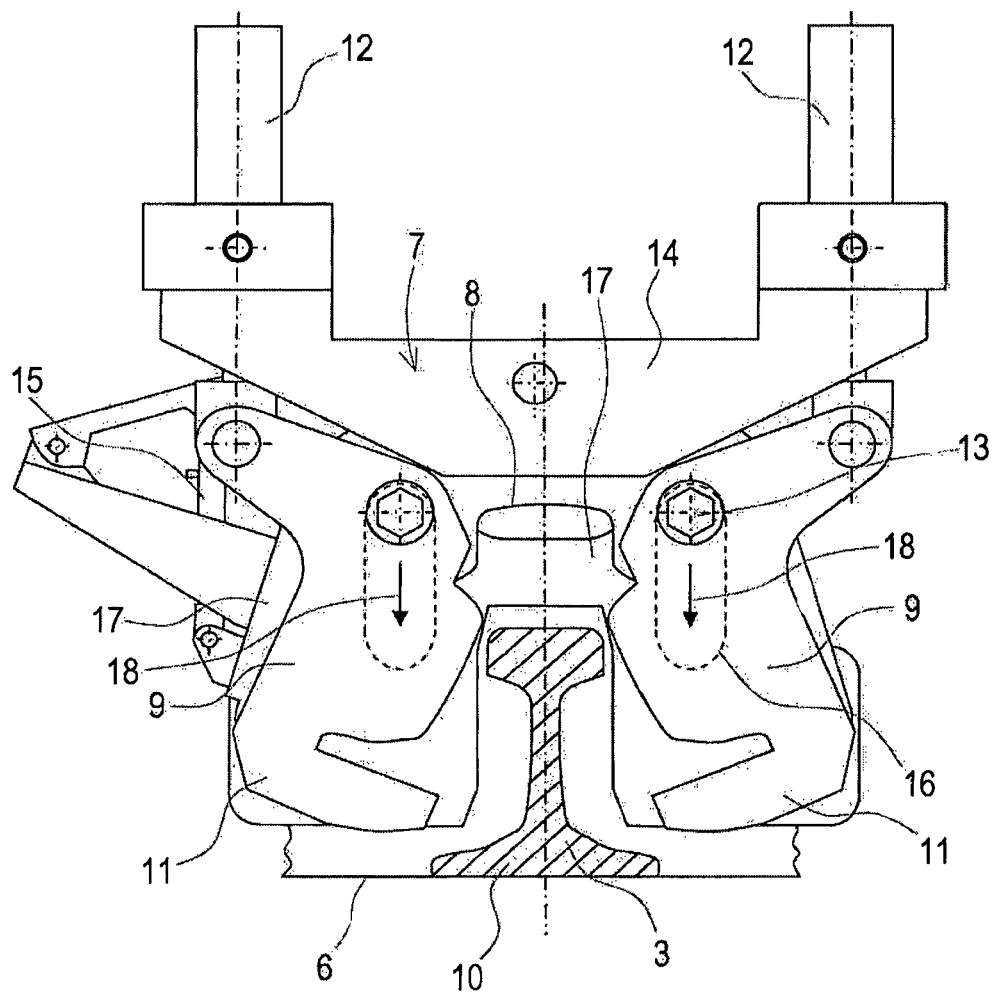
Figure 3:
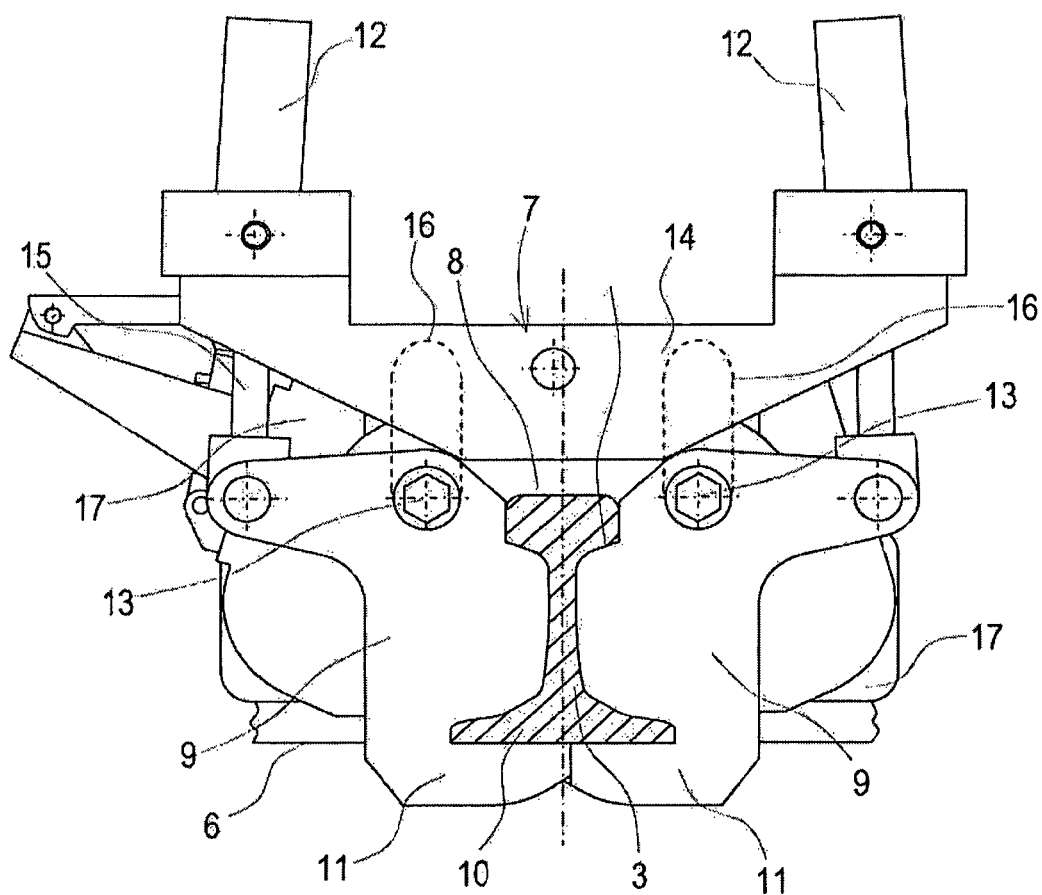

As visible in FIGS. 2 and 3, the shearing device 7 is composed of a head part 8 designed to be placed on a rail head, two side parts 9 movable towards one another in each case, and a rail base section 11 provided for being applied to a rail base 10 when in a shearing position. The two side parts 9 with the attached rail base sections 11 are pivotable by means of pivot drives 12 about an axis 13 for double-sided application to the rail 3. The shearing device 7, mounted together with the pivot drives 12 on a support frame 14, is designed to be lowered in vertical direction (see arrow 18 in FIG. 2) relative to a carrier body 17 or to the unit parts 5 along an elongated hole guide 16 by means of a drive 15.

The welding operation with formation of the weld bead is carried out with the shearing device 7 in raised position. To that end, the two rails 3 are gripped by the clamping jaws 4 and, after heating of the rail ends, pressed together. Since, as a result of a special design of the welding unit 1, the unit lower edge 6 is positioned during this approximately at the level of the rail base, the welding operation can be carried out without, or with only minimal, rail lifting while avoiding rail tensions detrimental to the welding quality.

As soon as the welding operation is terminated, the welding unit 1 together with the now welded and still clamped rail 3 is lifted so far that the shearing device 7 can be lowered without problems even in the event of a sleeper lying thereunder. As a result of this lowering motion, the two rail base sections 11 of the shearing device 7 move from a rest position situated above the unit lower edge 6 (see FIG. 2) to a shearing position situated below the unit lower edge 6 (see FIG. 3).

In further sequence, with actuation of the two pivot drives 12, each side part 9 together with the rail base section 11 is applied to the rail 3, and the still glowing weld bead is sheared off by a movement of the shearing device 7 in the longitudinal direction 2 of the rail.

Figure 4:
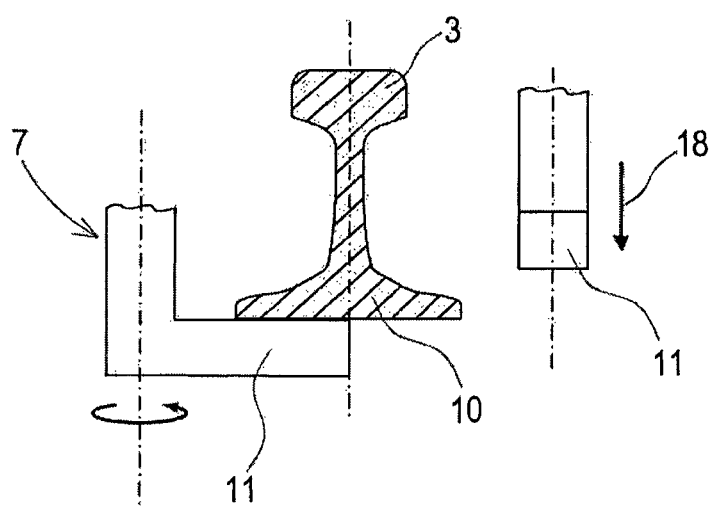
FIG. 4 shows a schematically simplified variant of the shearing device.

In a variant, shown in FIG. 4, of the shearing device 7 reduced to the rail base sections 11, the latter are designed independent of the side parts. For the shearing operation, the two rail base sections 11 can be lowered from a rest position (see right-hand half) into a working position (see left-hand half) and pivoted inward under the rail base 10 into a shearing position. The two side parts, now configured without rail base sections, need to be applied to the rail 3 merely by pivoting.

The invention claimed is:

1. A welding unit for welding rails of a track, the welding unit comprising:

a unit lower edge forming a lower boundary of the welding unit with reference to a vertical;

a shearing device for removing a weld bead, said shearing device having a head part to be placed on a rail head of the rails of the track, two side parts movably mounted towards one another, and rail base sections to be applied to a rail base of the rails of the track in a shearing position thereof, wherein one of the two side parts is attached to one of the rail base sections and another one of the two side parts is attached to another one of the rail base sections;

pivot drives for pivoting the two side parts with the attached rail base section; and a drive configured to lower said shearing device together with the pivot drives in a vertical direction relative to said welding unit so that said rail base sections of said shearing device are lowerable from a rest position above said unit lower edge into a shearing position below said unit lower edge.

2. The welding unit according to claim 1, wherein an entire said shearing device is mounted to be vertically adjustable.

3. The welding unit according to claim 2, which comprises pivot drives for pivoting said side parts and said rail base section and wherein said shearing device is configured to be lowered together with said pivot drives for a pivoting said side parts and said rail base section.

4. A welding method, comprising:
providing the welding unit according to claim 1;
welding the rails of the track with the welding unit and forming a welded rail with the weld bead, while maintaining the shearing device in a raised position during the welding; and
subsequently raising the welding unit together with the welded rail, lowering the shearing device into a shearing position, applying the shearing device to the welded rail, and shearing off the weld bead with shearing device.

* * * * *